Dec. 19, 1933.  F. SCHIMRIGK  1,939,924
SEWAGE TREATMENT PLANT
Filed May 18, 1931  2 Sheets-Sheet 1
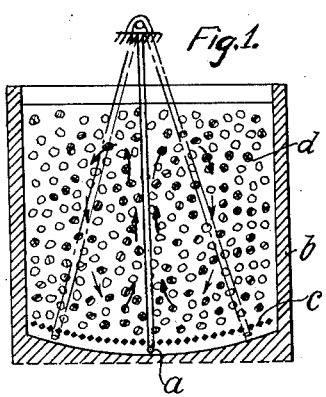
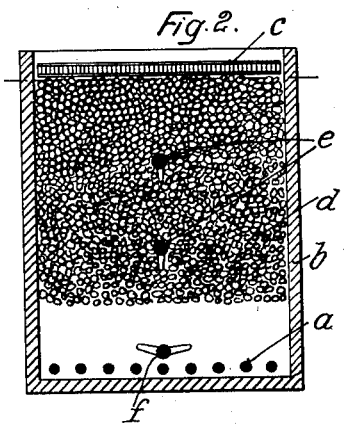
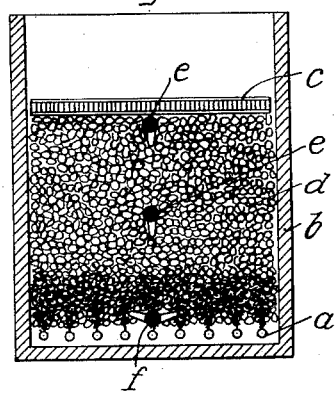
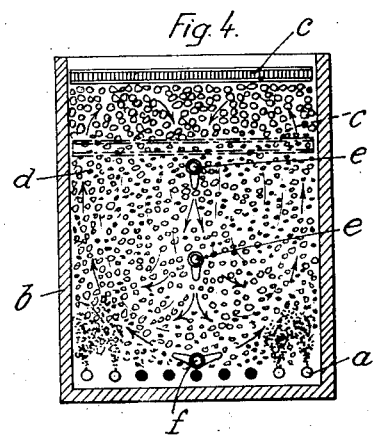
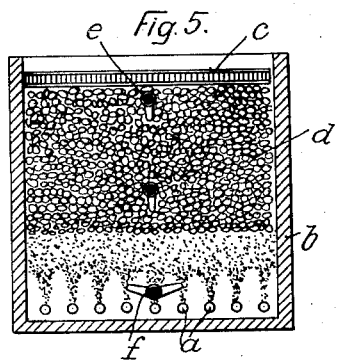
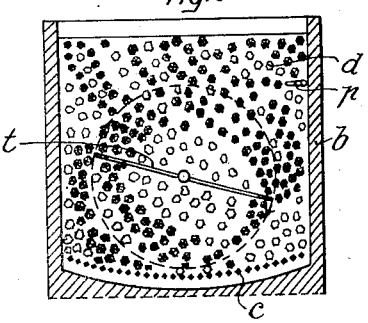
Inventor:
Dr. Friedrich Schimrigk

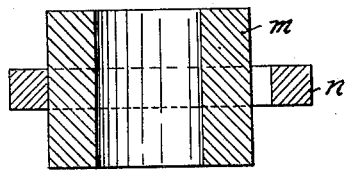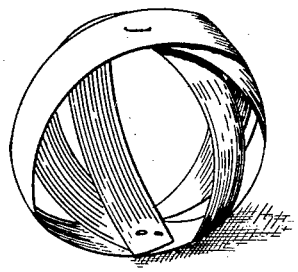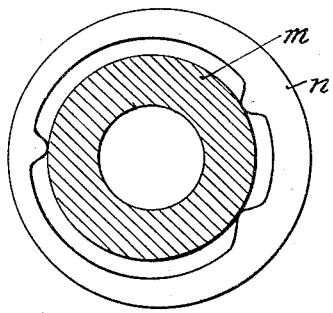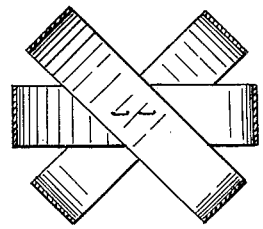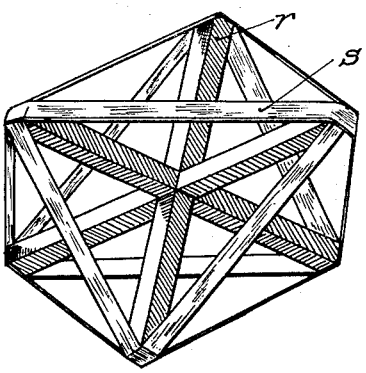

Patented Dec. 19, 1933

1,939,924

UNITED STATES PATENT OFFICE 1,939,924

SEWAGE TREATMENT PLANT

Friedrich Schimrigk, Weimar, Germany

Application May 18, 1931, Serial No. 538,304, and in Germany July 6, 1929

8 Claims. (Cl. 210—2)

My invention relates to sewage treatment plants and more particularly to plants of this kind in which the biological purification of sewage or waste water is effected by living organism or bacteria. As oxygen must be furnished to such organisms or bacteria, either compressed air is supplied or the liquid is aerated by agitation.

There are already known activated sludge processes of purification in which compressed air is supplied to the sewage or the like in a tank at the same time the contents of the tank mechanically agitated.

In order to provide the possibility of settling of the activated sludge, settlement bodies, that is bodies on which the activated sludge may settle, are sometimes introduced into the treatment tank. Such bodies may either consist of irregular aggregates of coke and the like, or consist of wooden laths or the like assembled to form a rigid structure, said aggregates of coke or laths being united into a firm structure and thereupon inserted into or mounted in the treatment tank.

The use of such structures in the treatment tank offers the advantage that plants operated in this way are much less sensitive to toxins and to the effects of temporary overload and temporary insufficiency of aeration than plants devoid thereof. This advantage is, however, countered by certain disadvantages.

Irregular aggregates of coke, slag and the like permit of economical use of the air diffused, but early clogging of these bodies can only be avoided if the plant is only weakly charged with sewage or waste water, so that with a given output the plant is relatively large and expensive.

On the other hand, if the purifying plant is heavily loaded, the bodies on which the organisms settle must be periodically taken out of the plant and cleaned by washing. This represents an addition to the cost of operation and also renders necessary the provision of reserve plants, so that the entire installation will not require to be put out of operation to permit of the cleaning of the said bodies.

As distinguished from a loose immovable aggregate of coke, slag and the like, settlement bodies composed of wooden laths and the like offer the advantage that they do not become clogged so rapidly. On the other hand, they suffer from the drawback that the air can readily escape from the liquid so that the consumption of air is disproportionately high.

In order now to obtain the full advantage of the known arrangements without the drawbacks, according to my invention there are used loose settlement bodies offering a maximum surface which can be moved within the tank for the purpose of cleaning.

In this manner, the air and the sewage or waste water are caused to ascend along a path of maximum length so as to obtain with certainty economical utilization of the air.

In consequence of the circulation of the settlement bodies which may be effected continuously or intermittently it is impossible for them to be clogged, so that the installation does not require to be put out of operation for the purpose of cleaning, even when it is continuously and heavily loaded.

In consequence of the small volume of the settlement bodies in question a considerably smaller proportion of the cubical capacity of the tank is occupied by such bodies than in known arrangements. The cost of erection and of operation is correspondingly reduced. The said bodies may be as heavy as or heavier or lighter than water so that they tend to remain in suspension or to rise to the surface or to sink to the bottom. To bring about the circulation of these bodies it is therefore necessary to cause external forces to act thereon.

In the case of settlement bodies which are heavier than water, movement of said bodies may, for instance, be effected by introducing larger quantities of air than are necessary for normal operation in upwardly directed currents near the bottom of the tank. By the impact of the air jets on the settlement bodies the latter are impelled upwardly, the effect of the air jets being increased by reason that air bubbles adhere to the bodies and increase their buoyancy.

The distribution of the air jets depends on the conditions of operation and other circumstances so that either the entire area or only a part of the area is impacted with air. Since, as a rule, the settlement bodies are not aerated more than is necessary for biological purification, the additional quantities of air introduced for the purpose of effecting circulation of the bodies may be effected intermittently by means of a fan which is periodically switched into and out of action by means of an electrical time switch.

If there are used settlement bodies which are lighter than water, the external forces must be oppositely directed, that is, depending on the specific gravity of the bodies, the additional forces must act in opposition to gravity or to the natural buoyancy so that the desired circulation or movement of the bodies is brought about.

By setting up water currents the strength, distribution and direction of which are adjusted in accordance with the conditions, the effect of the air jets may be supplemented.

Finally, the circulation of the bodies by air or water jets or both may be promoted by mechanical means, or mechanical means alone may be employed to effect circulation of the bodies.

Where it is desired to cause the external forces to act in vertical direction, depending on the specific gravity of the settlement bodies used the air or the water jets or both are directed vertically upwards or downwards.

In certain cases, however, it may be desired to impart movement to the settlement bodies in some other direction by imparting motion to said bodies at an angle inclined to the vertical or perpendicularly to the direction of buoyancy or gravity.

The settlement bodies may be constituted of any suitable material having the desired specific gravity for each particular case and having a large surface in proportion to the volume, for example, light coke, slag, wooden rings, pumice, pumice concrete bodies or metals, the shape and gravity of these bodies being properly selected. There may be advantageously used bodies consisting of wood shavings or very thin metal sheets. Wooden rings and other bodies of large volume and low specific gravity may be loaded on one side or both sides by rings of earthenware or cement, metallic pieces and the like. By suitable loading the bodies can be caused to occupy any desired position in suspension in the water. It is advantageous to employ bodies of annular or spherical structure so that they may rotate in the waste water about any desired axes and thus be washed on all sides. Bast and fibrous materials may be used in conjunction with other materials. The weight of settlement bodies of high specific gravity may be reduced by including gases or air water and gastight in said bodies.

One embodiment of the invention is illustrated by way of example in Figs. 1 to 11 of the accompanying drawings.

Fig. 1 is a section through a treatment tank which is charged with settlement bodies and provided with an air supply pipe, Fig. 2 a section through a sewage treatment tank which is charged with settlement bodies and provided with a plurality of air and water supply pipes, Figs. 3 to 5 are sections through the sewage treatment tank charged with settlement bodies and provided with air and water supply pipes showing the aeration and revolution of the settlement bodies, Fig. 6 is a section through the sewage treatment tank with settlement bodies including mechanical agitating means as well as air and water supply pipes, Figs. 7 and 8 are a longitudinal and transverse section, respectively, through a settlement body which is loaded by means of a ring, Figs. 9 and 10 a perspective view and top view, respectively, of a settlement body which consists of wood shavings, and Fig. 11 a perspective view of a settlement body which consists of a frame, with fibrous material thereon.

As shown in Fig. 1 there are located in the sewage tank $b$ loose settlement bodies $d$ which may be of the form shown in Figs. 7 and 11 or of other form. Figs. 7 and 8, in particular, show a settlement body, which consists of a wooden ring $m$ which is loaded by a ring $n$ of earthenware, cement or metal. In order to give the settlement body shown in Figs. 7 and 8 any desired condition of suspension in the water, the ring $n$ as shown in Fig. 8 may be constructed with walls of uneven thickness.

The aforementioned air supply pipe is shown in Fig. 1 in the form of a vibratory pipe, the perpendicular position of said pipe being shown in full drawn lines and the two end positions in dotted lines. During normal operation of the sewage treatment plant a vibratory motion is imparted to said pipe with the effect that the entire content of the tank is uniformly aerated. If said pipe is kept at rest in perpendicular position, as shown in Fig. 1, the settlement bodies will be revolved in the direction shown by arrows. On the other hand, if settlement bodies should remain at rest near the wall of the tank, said pipe may be moved into its end position, for instance, as indicated in dotted lines, with the effect that said settlement bodies near the wall will be revolved.

According to Figs. 9 and 10 the settlement bodies are made from wood shavings, the several rings of wood shavings being kept together by clamps, while the settlement body shown in Fig. 11 consists of a wooden frame, bast or fibrous material being wound around said frame, as shown at $r$ and $s$.

Settlement bodies of high specific gravity may be constructed in the form of hollow bodies which are closed up towards the outside so that gases or air may be introduced into the hollow space of said body for the purpose of reducing the specific gravity of the settlement body as a whole. It is assumed that the bodies in the sewage tank shown in Fig. 1 are naturally heavier or are loaded by the sludge to be heavier than water, so that they tend to sink to the bottom of the tank under the influence of gravity. Extending in the direction of one axis of the tank there is located beneath the grating $c$ an air supply pipe $a$ through which air may be introduced into the tank. When now sufficient air is passed through the pipe $a$, the bodies located above the pipe are moved upwards as indicated by arrows. The space immediately above the pipe $a$ is thus vacated by the bodies, so that unaerated bodies can slip into the space vacated, come under the influence of the air currents and be elevated.

The ascending bodies displace laterally those located adjacent to the surface, the displaced bodies being de-aerated and caused to sink, as they are now heavier than water, so that they descend to the bottom at the sides of the tank to be again circulated.

Instead of one air supply pipe $a$ there may be employed several pipes distributed over the area of the bottom of the tank, as shown in Figs. 2, 3, 4 and 5.

In addition to the air supply pipes $a$ there may also be used pipes $e$ and $f$ for the supply of pressure water, as shown in Figs. 2, 3, 4 and 5 which show a sewage treatment tank and settlement bodies that are lighter than the sewage in the tank.

As Fig. 4 shows, the settlement bodies are revolved and cleaned by washing by the effect of water jets which supplement the air jets, said water jets being of downward or lateral direction.

Supply pipes for pressure water may be used in case it is intended to either effect movement of the settlement bodies or to supplement the action of the air jets by currents of water.

In the case where several air supply pipes are distributed over the cross-sectional area of the tank bottom the air supply may be distributed over the entire cross-sectional area as shown in Figs. 3 and 5 or air may be introduced into certain parts only of the tank as shown in Fig. 4.

Regulating the distribution of air, in case only one pipe is employed according to Fig. 1, is rendered possible by the use of a single pipe which is given a vibratory movement. At standstill of this pipe only certain parts of the cross-sectional area will be impacted, while the entire cross-sectional area will be impacted if a vibratory movement is given to said pipe.

If several pipes are used as shown in Figs. 3 and 5 a uniform distribution of air may also be attained without vibratory movement all over the cross-sectional area of the tank.

If the supply to certain of the pipes as shown in Fig. 4 is cut off there is effected an increased circulation of the settlement bodies. The intensity of the circulating movement or of the aeration or both can be easily regulated in this case by suitable control of the air or water jets.

The effect of the air or water jets may be brought about or supplemented by mechanical devices also. As Fig. 6 shows a mechanical agitator $t$ is provided in the sewage treatment tank $b$, and regulable nozzles $p$ for the supply of air or water to the tank may be employed in order to supplement the action of said agitator.

If desired the settlement bodies which float on the surface may be acted on by jets from manually controlled sprinklers.

By means of a suitable wire grating or the like movement of the settlement bodies can be counter-acted in any desired manner and the ascending bodies can be prevented from being washed out of the tank during the cleaning operation.

In the example shown in Fig. 4, the wire grating $c$ or the like may be mounted displaceably permitting to increase the play for the settlement bodies to be revolved for the purpose of being washed, said increase of play being brought about by raising the wire grating $c$. On the other hand, if the wire grating $c$ is to be mounted fixedly, it may preferably be positioned perpendicularly to the wall of the tank.

By means of like wire gratings the settlement bodies at the entrance to the tank can be prevented from becoming mixed with those at the middle and at the exit end. The wire gratings are mounted preferably in a direction parallel to the lateral walls of the tank. In this way it is ensured in simple manner that organisms acting at the front end of the tank are stimulated more than those at the rear end.

Step by step treatment of the sewage or waste water is thus rendered readily possible; this mode of treatment may be further developed by using known processes of biological treatment prior or subsequent to my present process.

By reason of the fact that the air is utilized in an extremely economical manner, and prevented against being soiled the consumption of air is considerably reduced. Also fine adjustment of the air supply can be effected by means of the aforementioned intermittent aeration with the aid of a fan or an auxiliary fan or blower which is periodically switched on and off by properly adjusting the times of operation, without reducing the energy necessary for the cleaning process.

I claim:

1. A sewage treatment plant for the biological purification of sewage or waste water, said plant comprising a treatment tank, an aggregate of settlement bodies of a specific gravity which is equal or nearly equal to that of the sewage or waste water in said tank permitting settling of the organisms or bacteria contained in said sewage or waste water on said bodies, and an aerating device permitting air to be passed into said treatment tank past said bodies for the purpose of cleaning the latter.

2. A sewage treatment plant as specified by claim 1 in which plant the means for moving the settlement bodies in the treatment tank and the sewage or waste water therein consists of a device adapted to pass currents of water past said bodies for the purpose of cleaning the latter.

3 A sewage treatment plant as specified by claim 1 in which plant the means for moving the settlement bodies in the treatment tank and the sewage or waste water therein consists of a mechanical agitating device.

4. A sewage treatment plant as specified by claim 1 in which plant the means for moving the settlement bodies in the treatment tank and the sewage or waste water therein consists of an aerating device adapted to pass air into the treatment tank past a part only of said settlement bodies for the purpose of clening the latter.

5. A sewage treatment plant as specified by claim 1 in which plant the means for moving the settlement bodies in the treatment tank and the sewage or waste water therein consists of an aerating device permitting air to be passed into the treatment tank past said bodies for the purpose of cleaning the latter from organisms or bacteria settled thereon, said aerating device including a vibratory pipe and means to cause standstill of said pipe for revolving and washing said bodies in suitable position of said pipe.

6. A sewage treatment plant as specified by claim 1 in which plant the settlement bodies consist of wooden rings which are loaded by rings of earthenware or the like, metal pieces, nails or other substances of a specific gravity higher than that of said wooden rings.

7. A sewage treatment plant as specified by claim 1 in which plant the settlement bodies consist of rings of earthenware composed of a mixture of clay and pumice.

8. A sewage treatment plant as specified by claim 1 in which plant the settlement bodies consist of rings composed of a mixture of cement and pumice.

FRIEDRICH SCHIMRIGK.